United States Patent
Miyairi et al.

(10) Patent No.: US 10,024,209 B2
(45) Date of Patent: Jul. 17, 2018

(54) EXHAUST GAS PURIFICATION FILTER, EXHAUST GAS PURIFIER, AND METHOD OF USING EXHAUST GAS PURIFIER

(71) Applicant: NGK INSULATORS, LTD., Nagoya (JP)

(72) Inventors: Yukio Miyairi, Nagoya (JP); Toshio Yamada, Nagoya (JP); Toshihiro Hirakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 97 days.

(21) Appl. No.: 15/073,765

(22) Filed: Mar. 18, 2016

(65) Prior Publication Data
US 2016/0281562 A1    Sep. 29, 2016

(30) Foreign Application Priority Data
Mar. 25, 2015  (JP) .................. 2015-063082

(51) Int. Cl.
| | | |
|---|---|---|
| *F01N 3/022* | (2006.01) | |
| *F01N 3/025* | (2006.01) | |
| *F01N 3/035* | (2006.01) | |
| *F01N 3/20* | (2006.01) | |
| *F01N 9/00* | (2006.01) | |

(52) U.S. Cl.
CPC .......... *F01N 3/0222* (2013.01); *F01N 3/025* (2013.01); *F01N 3/035* (2013.01); *F01N 3/2066* (2013.01); *F01N 3/2073* (2013.01); *F01N 9/00* (2013.01); *F01N 2330/60* (2013.01);
(Continued)

(58) Field of Classification Search
CPC ........ F01N 3/0222; F01N 3/025; F01N 3/035; F01N 3/2066; F01N 3/2073; F01N 9/00; F01N 2330/60; F01N 2510/06; F01N 2610/03; Y02T 10/47
See application file for complete search history.

(56) References Cited

U.S. PATENT DOCUMENTS

| | | | |
|---|---|---|---|
| 8,444,739 B2 | 5/2013 | Mizuno et al. | |
| 8,734,558 B2 | 5/2014 | Miyairi | |

(Continued)

FOREIGN PATENT DOCUMENTS

| | | |
|---|---|---|
| JP | 2003-210922 | 7/2003 |
| JP | 2013-002391 | 1/2013 |

(Continued)

OTHER PUBLICATIONS

Japanese Office Action bearing dated Jun. 5, 2018 from a corresponding Japanese patent application (JP 2015-063082), 4 pages.

*Primary Examiner* — Brandon Lee
(74) *Attorney, Agent, or Firm* — Burr & Brown, PLLC

(57) ABSTRACT

An exhaust gas purification filter includes: a honeycomb structure body having partition walls for defining a plurality of cells that extend from an inflow end face to an outflow end face; an inflow side plugging portion; an outflow side plugging portion; and a porous surface trapping layer which is disposed on an inflow surface which is a surface on an inflow cell side which is the cell in which the outflow side plugging portion is disposed, among surfaces of the partition walls, in which the surface trapping layer has a thickness of 10 to 60 μm and an average pore diameter of 0.3 to 5 μm, and in a section which is parallel to a cell extending direction.

15 Claims, 2 Drawing Sheets

(52) U.S. Cl.
    CPC ...... *F01N 2510/06* (2013.01); *F01N 2610/03* (2013.01); *Y02T 10/47* (2013.01)

(56) References Cited

U.S. PATENT DOCUMENTS

2010/0024397 A1* 2/2010 Chi .................... F01N 3/106
                                              60/285
2010/0135866 A1* 6/2010 Mizuno ............ B01D 46/2425
                                              422/180

FOREIGN PATENT DOCUMENTS

| JP | 2014-018768 | 2/2014 |
| JP | 5616059 B2 | 10/2014 |

\* cited by examiner

EXHAUST GAS PURIFICATION FILTER, EXHAUST GAS PURIFIER, AND METHOD OF USING EXHAUST GAS PURIFIER

The present application is an application based on JP2015-063082 filed on Mar. 25, 2015 with the Japan Patent Office, the entire contents of which are incorporated herein by reference.

BACKGROUND OF THE INVENTION

Field of the Invention

The present invention relates to an exhaust gas purification filter, an exhaust gas purifier, and a method of using the exhaust gas purifier. More particularly, the present invention relates to the exhaust gas purification filter capable of properly purifying $NO_X$ in exhaust gas even during the regeneration of the filter, suppressing an increase in pressure loss, and including a surface trapping layer with appropriate durability, the exhaust gas purifier, and the method of using an exhaust gas purifier.

Description of the Related Art

In order to purify exhaust gas emitted from a diesel engine or the like, a plurality of filters are disposed in an exhaust path of the engine. As the filters, there are a diesel particulate filter (DPF), an SCR catalyst (a catalyst for selectively reducing components to be purified through a reduction reaction) filter disposed on the downstream side of the DPF, and the like. In addition, the DPF primarily traps particulate matter (PM) containing soot in the exhaust gas and prevents the particulate matter from being emitted to the air. An SCR catalyst converter reduces $NO_X$ in the exhaust gas using ammonia ($NH_3$) generated by decomposition of urea injected from a urea injector disposed on the upstream side thereof.

The DPF typically includes a catalyst loaded therein, which contains a precious metal, for the purpose of oxidizing and removing carbon monoxide (CO) and hydrocarbons (HC), and the like. That is, the DPF burns off and removes soot accumulated therein every predetermined period (combustion regeneration process). At this time, the combustion of the soot is accelerated by the catalyst. In addition, carbon monoxide (CO) and hydrocarbons (HC) generated by the decomposition of the soot during the combustion of the soot are oxidized and removed by the catalyst.

In addition, there may be cases where a trapping layer (surface trapping layer) for trapping the PM is disposed on the surface of a partition wall of the DPF (refer to Patent Document 1). In addition, in the DPF, the PM is prevented from penetrating into the porous partition wall and blocking the pores of the partition wall by the surface trapping layer. When the pores of the partition wall are blocked, there is a problem in that pressure loss is rapidly increased.

[Patent Document 1] Japan Patent No. 5616059

SUMMARY OF THE INVENTION

Here, in the combustion regeneration process of the DPF, the temperature of the exhaust gas emitted from the DPF is a high temperature, and thus the reduction of $NO_X$ may not be appropriately performed in the SCR catalyst converter. That is, ammonia is decomposed by the high-temperature of exhaust gas, and thus the $NO_X$ cannot be sufficiently reduced. Therefore, during the combustion regeneration process of the DPF, there is a problem in that the amount of $NO_X$ emitted from the diesel engine or the like is significantly increased.

For the next years, it is expected that regulations on $NO_X$ emissions become stricter. In this case, it is postulated that the amount of $NO_X$ emitted during the combustion regeneration process of the DPF cannot satisfy emission regulation standards.

From the above circumstances. there is a need for the development of an exhaust gas purification filter capable of properly purifying $NO_X$ in exhaust gas even during the regeneration of the filter.

The invention has been made of taking the foregoing problems in the related art into consideration. An object of the invention is to provide an exhaust gas purification filter capable of properly purifying $NO_X$ in exhaust gas even during the regeneration of the filter, suppressing an increase in pressure loss, and including a surface trapping layer with appropriate durability.

According to the invention, an exhaust gas purification filter, an exhaust gas purifier, and a method of using an exhaust gas purifier are provided as follows.

According to a first aspect of the present invention, an exhaust gas purification filter including: a pillared honeycomb structure body having porous partition walls for defining a plurality of cells that extend from an inflow end face as one end face to an outflow end face as the other end face; inflow side plugging portions disposed on the inflow end face side of predetermined cells of the cells; outflow side plugging portions disposed on the outflow end face side of the residual cells of the cells; and a porous surface trapping layer disposed on an inflow surface which is a surface on an inflow cell side which is the cell in which the outflow side plugging portion is disposed is provided, among surfaces of the partition walls, wherein the surface trapping layer has a thickness of 10 μm to 60 μm, the surface trapping layer has an average pore diameter of 0.3 μm to 5 μm, and in a section of the partition wall which is parallel to a cell extending direction, when a region between a position at 10% of a length of the partition wall in a thickness direction thereof and a position at 90% of the length of the partition wall in the thickness direction thereof is referred to as a central region and a region between the central region and the surface trapping layer is referred to as an inlet region, a porosity P1 of the central region is lower than a porosity P2 of the inlet region.

According to a second aspect of the present invention, the exhaust gas purification filter according to the first aspect is provided, wherein a value of a ratio of the porosity P2 of the inlet region to the porosity P1 of the central region is 1.05 to 1.8.

According to a third aspect of the present invention, the exhaust gas purification filter according to the first or second aspects is provided, wherein a standard deviation of the thickness of the partition wall is 20% or lower.

According to a fourth aspect of the present invention, the exhaust gas purification filter according to any one of the first to third aspects is provided, wherein both of the partition wall and the surface trapping layer is made of a material that contains silicon carbide particles as aggregates and a binding material that binds the aggregates as a main component, and the binding material is made of cordierite, mullite, alumina, or an oxide of a mixture thereof.

According to a fifth aspect of the present invention, the exhaust gas purification filter according to any one of the first to fourth aspects is provided, wherein the partition wall and the surface trapping layer are monolithically formed with each other by firing.

According to a sixth aspect of the present invention, the exhaust gas purification filter according to any one of the first to fifth aspects is provided, wherein a catalyst containing a precious metal is not loaded, or the catalyst containing the precious metal is loaded in a proportion of 1 g/L or less.

According to a seventh aspect of the present invention, the exhaust gas purification filter according to any one of the first to sixth aspects is provided, wherein 80 mass % or more of the catalyst containing the precious metal is loaded in an outlet region which is a region excluding the central region and the inlet region of the partition wall.

According to an eighth aspect of the present invention, an exhaust gas purifier for purifying exhaust gas emitted from an engine, including: the exhaust gas purification filter according to any one of the first to seventh aspects is provided; an SCR catalyst converter which is disposed on a downstream side of the exhaust gas purification filter and includes an SCR catalyst loaded therein; an upstream side oxidation catalyst which is disposed on an upstream side of the exhaust gas purification filter and includes an oxidation catalyst loaded therein; and a urea injector which is disposed between the upstream side oxidation catalyst and the exhaust gas purification filter or is disposed between the exhaust gas purification filter and the SCR catalyst converter to inject urea.

According to a ninth aspect of the present invention, the exhaust gas purifier according to the eighth aspect is provided, wherein the exhaust gas purification filter does not include a catalyst containing a precious metal loaded therein.

According to a tenth aspect of the present invention, the exhaust gas purifier according to the eighth or ninth aspects is provided, further including: a downstream side oxidation catalyst which is disposed on a downstream side of the SCR catalyst converter and includes an oxidation catalyst loaded therein.

According to an eleventh aspect of the present invention, a method of using the exhaust gas purifier including: generating carbon monoxide and hydrocarbons by incompletely burning particulate matter in the exhaust gas purification filter during an operation of burning off and removing the particulate matter accumulated in the exhaust gas purification filter of the exhaust gas purifier according to any one of the eighth to tenth aspects is provided; supplying the generated carbon monoxide and hydrocarbons to the SCR catalyst converter; and purifying $NO_X$ in exhaust gas using the carbon monoxide and hydrocarbons in the SCR catalyst converter.

In the exhaust gas purification filter of the invention, the surface trapping layer has a thickness of 10 μm to 60 μm, and an average pore diameter of 0.3 μm to 5 μm. In addition, in the exhaust gas purification filter of the invention, a porosity P1 of the central region is lower than a porosity P2 of the inlet region in the partition wall. Accordingly, the exhaust gas purification filter of the invention properly purifies $NO_X$ in exhaust gas even during the regeneration of the filter, suppresses an increase in pressure loss, and has good durability in the surface trapping layer.

Since the exhaust gas purifier of the invention includes the exhaust gas purification filter of the invention, $NO_X$ in exhaust gas even during the regeneration of the exhaust gas purification filter can be properly purified.

In the method of using an exhaust gas purifier of the invention, $NO_X$ in exhaust gas can be properly purified using the exhaust gas purifier of the invention even during the regeneration of the exhaust gas purification filter.

DESCRIPTION OF THE PREFERRED EMBODIMENTS

Hereinafter, embodiments of the invention will be described. The invention is not limited to the following embodiments, and it should be naturally understood that appropriate modifications and improvements of the following embodiments based on general knowledge of those skilled in the art without departing from the spirit of the invention are included in the scope of the embodiment.

(1) Exhaust Gas Purification Filter

Figure 1:
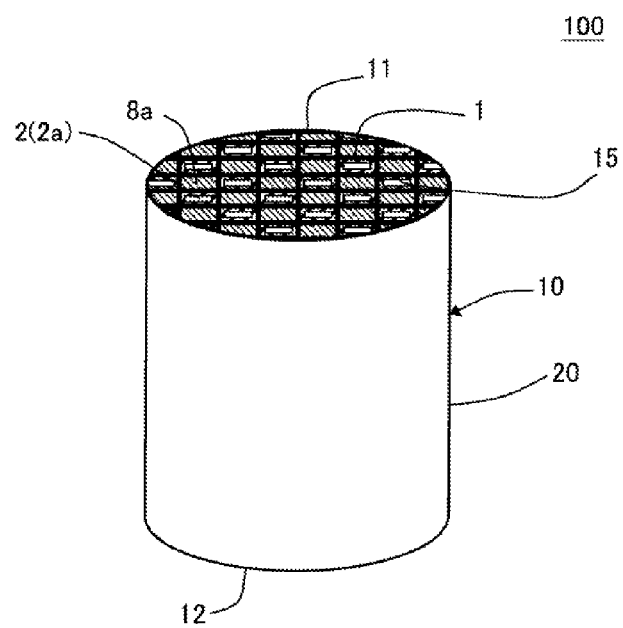
FIG. 1 is a perspective view schematically showing an embodiment of an exhaust gas purification filter of the invention.
Figure 2:
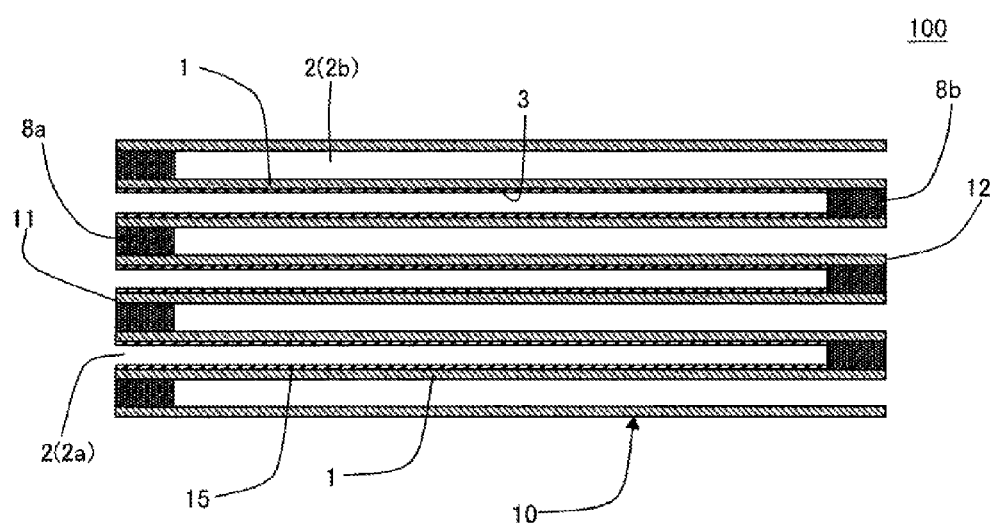
FIG. 2 is a sectional view schematically showing a section parallel to a cell extending direction, in the embodiment of the exhaust gas purification filter of the invention.

An embodiment of an exhaust gas purification filter of the invention is an exhaust gas purification filter 100 shown in FIGS. 1 and 2. The exhaust gas purification filter 100 includes a pillared honeycomb structure body 10 having porous partition walls 1, inflow side plugging portions 8a, outflow side plugging portions 8b, and porous surface trapping layers 15. The honeycomb structure body 10 includes the partition walls 1 which define a plurality of cells 2 extending from an inflow end face 11 as one end face, to an outflow end face 12, which is the other end face. The inflow side plugging portions 8a are plugging portions disposed on the inflow end face 11 side of predetermined cells 2. The outflow side plugging portions 8b are plugging portions disposed on the outflow end face 12 side of the residual cells 2. The surface trapping layers 15 are layers disposed on inflow surfaces 3 that are surfaces on inflow cells 2a side, which are the cells 2 in which the outflow side plugging portions 8b are disposed, among the surfaces of the partition walls 1. The thickness of the surface trapping layer 15 is 10 μm to 60 μm. In addition, the average pore diameter of the surface trapping layer 15 is 0.3 μm to 5 μm. In addition, in a section parallel to a extending direction of the cells 2, a region between a position A at 10% of the length of the partition wall 1 in a thickness direction thereof and a position B at 90% of the length of the partition wall 1 in the thickness direction thereof is referred to as a central region 5 (see FIG. 3). In addition, in the section parallel to the extending direction of the cells 2, a region between the central region 5 and the surface trapping layer 15 is referred to as an inlet region 6. Here, in the exhaust gas purification filter 100, a porosity P1 of the central region 5 is lower than a porosity P2 of the inlet region 6.

In this exhaust gas purification filter 100, $NO_X$ in exhaust gas even during the regeneration of the filter can be properly purified. In addition, in the exhaust gas purification filter 100, an increase in pressure loss is suppressed. Furthermore, in the exhaust gas purification filter 100, the durability of the surface trapping layer is appropriate.

In an exhaust gas purification filter in the related art, carbon monoxide and hydrocarbons are oxidized and removed by a catalyst containing a precious metal. On the other hand, in the exhaust gas purification filter of the invention, the concentration of carbon monoxide and hydrocarbons emitted during the regeneration of the filter is high. In addition, the carbon monoxide and hydrocarbons emitted at a high concentration is supplied to an SCR catalyst converter disposed downstream of the exhaust gas purification filter. The SCR catalyst converter can properly purify $NO_X$ in exhaust gas using the carbon monoxide, the hydrocarbons, and ammonia. That is, in the SCR catalyst converter. $NO_X$ in the exhaust gas is purified by ammonia that comes from urea supplied from a urea injector. However, during the regeneration of the exhaust gas purification filter, the inside of the SCR catalyst converter reaches a high temperature, and the ammonia is decomposed. Therefore, there is a problem in that the purification of the $NO_X$ in the SCR catalyst converter cannot be sufficiently performed. Here, during the regeneration of the filter, the concentration of the carbon monoxide and the hydrocarbons emitted from the exhaust gas purification filter is allowed to be high. Accordingly, as well as the ammonia, the carbon monoxide and the hydrocarbons function as reductants, and thus $NO_X$ in the SCR catalyst converter can be properly purified. That is, the carbon monoxide and the hydrocarbons as well as the ammonia are used as the reductants and $NO_X$ is reduced in the SCR catalyst converter using the carbon monoxide and the hydrocarbons so as to be purified to nitrogen ($N_2$) and oxygen ($O_2$) which are harmless. In addition, the carbon monoxide and hydrocarbons are consumed as the reductants. Therefore, the carbon monoxide and hydrocarbons are less likely to be emitted to the air.

In addition, in the exhaust gas purification filter of the invention, in order to increase the concentration of the carbon monoxide and hydrocarbons emitted during the regeneration of the filter, particulate matter including soot accumulated in the exhaust gas purification filter is incompletely burned during the regeneration of the filter. That is, in the exhaust gas purification filter, the porosity P1 of the central region is lower than the porosity P2 of the inlet region, and specifically, voids 30 (see FIG. 4) (hereinafter, sometimes described as "accumulation space") are formed between the surface trapping layer and the partition wall. In addition, the particulate matter accumulated in the voids is exposed to a high temperature during the regeneration of the filter and enters a state of being not sufficiently supplied with oxygen (smothered state). The particulate matter is not sufficiently supplied with oxygen because it is present in the voids. From these circumstances, the particulate matter that is present in the voids causes incomplete combustion such that carbon monoxide and hydrocarbons are generated.

Figure 3:
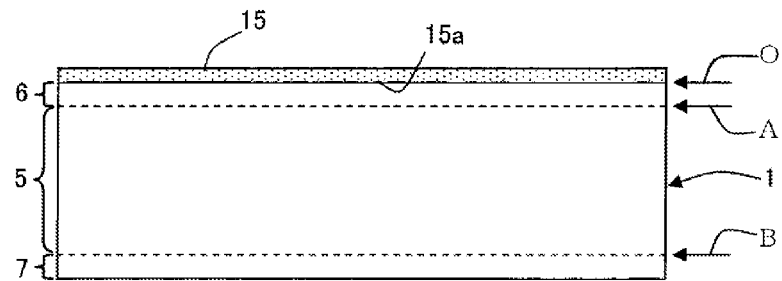
FIG. 3 is an enlarged sectional view schematically showing a portion of the section parallel to the cell extending direction, in the embodiment of the exhaust gas purification filter of the invention.
Figure 4:
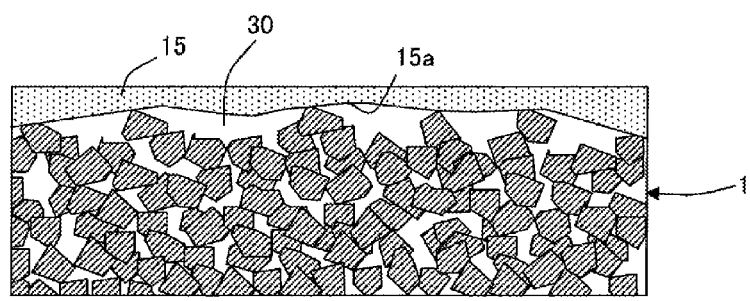
FIG. 4 is an enlarged sectional view schematically showing the vicinity of the boundary between a partition wall and a surface trapping layer in the section parallel to the cell extending direction, in the embodiment of the exhaust gas purification filter of the invention.

FIG. 1 is a perspective view schematically showing the embodiment of the exhaust gas purification filter of the invention. FIG. 2 is a sectional view schematically showing the section parallel to the cell extending direction, in the embodiment of the exhaust gas purification filter of the invention. FIG. 3 is an enlarged sectional view schematically showing a portion of the section parallel to the cell extending direction, in the embodiment of the exhaust gas purification filter of the invention. FIG. 4 is an enlarged sectional view schematically showing the vicinity of the boundary between the partition wall and the surface trapping layer in the section parallel to the cell extending direction, in the embodiment of the exhaust gas purification filter of the invention.

In this specification, the porosities of the central region and the inlet region are values measured by an image analysis process performed as follows. Specifically, first. a small piece that is 1 cm or less on each side is cut from a portion of the partition wall, and the small piece is buried in a resin. Thereafter, a face including the section of the partition wall is polished, and an image of the section is photographed by a scanning electron microscope (SEM). Next, the obtained SEM image is binarized into a void portion (resin portion) and a solid portion, and the porosity is calculated from the area of each of the portions. In this manner, the porosities of the central region and the inlet region are calculated.

The "inlet region" is a region between the central region and the surface trapping layer as described above. That is, as shown in FIG. 4, in a section perpendicular to the extending direction of the cells 2, the inlet region is a region that is present between an inner surface 15a (position O in FIG. 3) of the surface trapping layer 15 and the boundary surface side (that is, the position A at 10% of the length of the partition wall 1 in the thickness direction thereof) of the central region 5 (see FIG. 3) on the surface trapping layer 15 side. Therefore, when the porosity of the inlet region is calculated, the voids between the surface trapping layer 15 and the partition wall 1 are also considered.

In the exhaust gas purification filter of the invention, the porosity P1 of the central region needs to be lower than the porosity P2 of the inlet region. That is, in the exhaust gas purification filter of the invention having the above structure, the inlet region functions as a heat-insulation layer between the surface trapping layer and the central region of the partition wall. Therefore, the particulate matter such as soot trapped in the surface trapping layer is insulated from the partition wall during the regeneration of the filter. That is, during the regeneration of the filter, heat generated due to the combustion of the soot is less likely to be dissipated to the partition wall. As a result, the accumulated soot enters the smothered state, and thus carbon monoxide and hydrocarbons are easily generated.

Specifically, in the exhaust gas purification filter of the invention, the value (P2/P1) of the ratio of the porosity P2 of the inlet region to the porosity P1 of the central region is preferably 1.05 to 1.8, more preferably 1.07 to 1.5, and particularly preferably 1.1 to 1.2. By allowing the P2/P1 to satisfy the above range, combustion heat of the soot is prevented from being dissipated to the partition wall. Therefore, the soot on the surface trapping layer easily enters the smothered state, and the amount of generated HC and CO is increased. When the P2/P1 is lower than the lower limit, there is a possibility that HC and CO may be insufficiently generated. When the P2/P1 is higher than the upper limit, there is a concern that the strength and durability of the partition wall may be degraded.

(1-1) Surface Trapping Layer

The surface trapping layer 15 is a porous layer having a smaller average pore diameter than that of the partition wall 1. Since the surface trapping layer 15 is provided, the surface trapping layer 15 traps particles having a large particle diameter (large-diameter particles) in the particulate matter included in the exhaust gas. Therefore, the pores of the partition wall 1 can be prevented from being blocked by the large-diameter particles.

The thickness of the surface trapping layer 15 is 10 μm to 60 μm, preferably 15 μm to 40 μm, more preferably 15 μm to 30 μm, and particularly preferably 15 μm to 25 μm. When the thickness of the surface trapping layer is lower than the lower limit, the particulate matter including the soot cannot be sufficiently trapped. When the thickness thereof is higher than the upper limit, there is a problem in that pressure loss is increased.

The average pore diameter of the surface trapping layer 15 is 0.3 μm to 5 μm, preferably 0.5 μm to 4 μm, more preferably 0.5 μm to 3 μm, and particularly preferably 0.5 μm to 2 μm. By allowing the average pore diameter of the surface trapping layer to be in the above range, a layer having the soot at a high density (soot layer) is formed on the surface trapping layer. As a result, carbon monoxide (CO) and hydrocarbons (HC) are easily generated during the combustion of the soot (during the regeneration of the filter) even outside the accumulation space. When the average particle diameter of the surface trapping layer is lower than the lower limit, there is a possibility that pressure loss may be increased. When the average pore diameter thereof is higher than the upper limit, the amount of soot passing through the surface trapping layer is increased, and it becomes difficult to intensively collect the soot on the surface trapping layer. Therefore, there is concern that CO and HC may be insufficiently generated during the regeneration.

(1-2) Honeycomb Structure Body

The thickness of the partition wall is preferably 50 μm to 500 μm, more preferably 100 μm to 450 μm, and particularly preferably 150 μm to 450 μm. When the thickness of the partition wall is lower than the lower limit, there is a possibility that strength may become insufficient. When the thickness thereof is higher than the upper limit, there is a possibility that pressure loss may be increased.

The standard deviation of the thickness of the partition wall is preferably 20% or lower, more preferably 5% to 15%, and particularly preferably 5% to 10%. When the standard deviation thereof is 20% or lower, the flow of the exhaust gas becomes uniform. Therefore, a state in which oxygen is not supplied to a portion of the soot due to the occurrence of an intensively excessive flow of the exhaust gas and an excessive amount of soot is left after combustion can be avoided. When the standard deviation thereof is higher than 20%, there is a possibility that a portion of soot may be left after combustion. In addition, for the standard deviation, from the section shown in FIG. 2, five arbitrary points which are at intermediate positions in the cell extending direction and are present in the direction perpendicular to the cell extending direction are selected. Other than these points, five arbitrary points which are present in the cell extending direction are selected. The standard deviation is the standard deviation σ of the thickness of the partition wall at the ten points in total.

The porosity of the partition wall is preferably 25% to 75%, more preferably 30% to 70%, and particularly preferably 34% to 68%. When the porosity thereof is lower than the lower limit, there is a possibility that pressure loss may be increased. When the porosity thereof is higher than the upper limit, there is a possibility that strength may become insufficient. The porosity of the partition wall is a value measured in the same manner as that of the surface trapping layer described above.

The average pore diameter of the partition wall is preferably 5 μm to 40 μm, more preferably 8 μm to 30 μm, and particularly preferably 9 μm to 25 μm. When the average pore diameter of the partition wall is lower than the lower limit, there is concern that pressure loss may be increased. When the average pore diameter thereof is higher than the upper limit, there is a possibility that the trapping efficiency of the soot may be reduced. The average pore diameter of the partition wall is a value measured in the same manner as the average pore diameter of the surface trapping layer described above.

The cell density of the honeycomb structure body is preferably 8 pieces/cm$^2$ to 95 pieces/cm$^2$, and more preferably 15 pieces/cm$^2$ to 78 pieces/cm$^2$. When the cell density thereof is lower than the lower limit, the filtration area is insufficient, and the pressure loss during the accumulation of the soot is increased. Therefore, there is a possibility that the trapping efficiency of the soot may be reduced. When the cell density thereof is higher than the upper limit, there is concern that pressure loss when soot is not accumulated (initial pressure loss) may be increased.

The partition wall is preferably made of a material that contains, as a main component, silicon carbide particles as aggregates and a binding material that binds the aggregates. In addition, the binding material is preferably a material containing Si as a main component, and is more preferably made of cordierite, mullite, alumina, or an oxide of a mixture thereof. By satisfying the conditions, the thermal conductivity of the partition wall is reduced, and thus heat generated by the combustion of the soot is less likely to be dissipated to the partition wall. As a result, incomplete combustion of the soot occurs during the combustion of the soot, and carbon monoxide and hydrocarbons are easily generated. In addition, the partition wall has a high heat capacity, and thus an excessive increase in the temperature of the inside of the filter during the regeneration of the filter can be prevented.

It is preferable that the partition wall 1 and the surface trapping layer 15 are formed monolithically with each other by firing. When the partition wall 1 and the surface trapping layer 15 are formed monolithically with each other by firing as described above, the durability of the surface trapping layer 15 is enhanced. That is, even when the exhaust gas purification filter 100 is used for a long period of time, problems such as damage to the surface trapping layer 15 or the like are less likely to occur. Here, "monolithic formation by firing" means to apply a coating material for the surface trapping layer to the surface of the partition wall of a honeycomb formed body (a structure before firing) and thereafter to fire the resultant, thereby integrally firing the honeycomb formed body and the coating material for the surface trapping layer and joining the partition wall and the surface trapping layer together. The coating material for the surface trapping layer is a material for forming the surface trapping layer.

(1-3) Catalyst

Typically, the exhaust gas purification filter (DPF) includes a catalyst containing a precious metal which is loaded therein in a proportion of about 5 g/L to 30 g/L. Here, it is preferable that in the exhaust gas purification filter of the invention, the catalyst containing the precious metal is not loaded therein, or the catalyst containing the precious metal is loaded in a proportion of 1 g/L or less. It is more preferable that the amount of the catalyst containing the precious metal loaded therein is 0.5 g/L or less. By satisfying such conditions, the amount of carbon monoxide and hydrocarbons reduced by the catalyst can be reduced. Therefore, a larger amount of carbon monoxide and hydrocarbons can be emitted from the exhaust gas purification filter (DPF). As a result, the reduction of NO$_X$ in the SCR catalyst converter can be properly performed.

In the case where the catalyst containing the precious metal is loaded in the exhaust gas purification filter 100, it is preferable that 80 mass % or more of the catalyst is loaded in an outlet region 7 which is a region excluding the central region 5 and the inlet region 6 of the partition wall 1. It is more preferable that 90 mass % or more of the catalyst is loaded in the outlet region 7. In this case, the amount of the catalyst loaded in the surface trapping layer is reduced, and thus the pores of the surface trapping layer can be prevented from being blocked by the catalyst, thereby preventing an excessive increase in pressure loss. In addition, contact between the soot and the precious metal can he prevented, and thus the amount of carbon monoxide (CO) and hydrocarbons (HC) generated on the surface trapping layer during the regeneration of the DPF can be increased.

(1-4) Plugging Portion

The exhaust gas purification filter 100 includes the inflow side plugging portions 8a and the outflow side plugging portions 8b. Since the plugging portions are provided, particulate matter in the exhaust gas can be properly trapped. In the honeycomb structure body 10 of the exhaust gas purification filter 100, the cells 2 in which the outflow side plugging portions 8b are disposed are the inflow cells 2a, and the cells 2 in which the inflow side plugging portions 8a are disposed are outflow cells 2b.

The length of the exhaust gas purification filter in the cell extending direction may be 30 mm to 500 mm.

The exhaust gas purification filter of the invention may further include a circumferential wall 20 (see FIG. 1) on the side surface of the honeycomb structure body.

The honeycomb structure body may be a bonded body formed of a plurality of honeycomb segments. That is, the honeycomb structure body may include an assembly of the plurality of honeycomb segments and a bonding portion made of a bonding material for bonding the honeycomb segments together.

(2) Method of Manufacturing Exhaust Gas Purification Filter

A method of manufacturing the exhaust gas purification filter of this embodiment will be described. First, a kneaded material for manufacturing the exhaust gas purification filter is prepared, and the kneaded material is formed to manufacture a honeycomb formed body (forming process). Thereafter, masking is performed by applying a mask to predetermined cells of the obtained honeycomb formed body (or a honeycomb dried body obtained after drying that is performed as necessary), a slurry for forming the trapping layer is applied to the surface of the partition walls of the cells other than the cells subjected to the masking, thereby forming a coating membrane (coating membrane forming process). Thereafter, the mask is removed, and the open ends of the predetermined cells at the inflow end face and the open ends of the residual cells at the outflow end face are plugged, thereby forming the inflow side plugging portion and the outflow side plugging portion (plugging process). Thereafter, the honeycomb formed body in which the coating membrane is formed and the plugging portions are alternately formed is fired, thereby manufacturing a honeycomb fired body (firing process). In this manner, the exhaust gas purification filter can be manufactured.

In addition, in a pre-process of the coating membrane forming process, particles that are removed by the firing, such as carbon particles, are applied to a surface (inflow surface) to which the slurry for forming the trapping layer is to be applied. Accordingly, the porosity P1 of the central region can be allowed to be lower than the porosity P2 of the inlet region. Specifically, voids can be formed between the surface trapping layer and the partition wall.

Hereinafter, each manufacturing process will be described in more detail.

(2-1) Forming Process

The forming process is a process of preparing the kneaded material made of a ceramic forming raw material containing a ceramic raw material, and molding the kneaded material, thereby forming the honeycomb formed body in which the plurality of cells, which are to become passage of a fluid, are defined.

It is preferable that the ceramic forming raw material is prepared by mixing the ceramic raw material with a dispersing medium, an organic binder, an inorganic binder, a pore former, a surfactant, and the like. The composition ratio of each of the raw materials is not particularly limited, and is preferably a composition ratio according to the structure, material, and the like of the exhaust gas purification filter to be manufactured.

As a method of preparing the kneaded material, for example, a method of using a kneader, a vacuum pugmill, or the like may be employed. As a method of forming the kneaded material, for example. a known forming method such as extrusion or injection molding may be used. For example, a method of forming the honeycomb formed body through extrusion using a die having desired cell shapes, partition wall thicknesses, and cell densities may be employed as an appropriate example.

Examples of the shape of the honeycomb formed body include pillar-shapes in which the cross-sections perpendicular to the center axis are circular, oval, racetrack-shaped, triangular, quadrangular, pentagonal, hexagonal, octagonal, and the like.

The obtained honeycomb formed body may also be dried. Examples of the drying method include hot air drying, microwave drying, dielectric drying, drying under reduced pressure, vacuum drying, and freeze-drying. It is preferable that among the methods, dielectric drying, microwave drying, and hot air drying are performed singly or in combination.

(2-2) Coating Membrane Forming Process

The slurry for forming the trapping layer is a slurry containing fine raw material particles for forming the surface trapping layer. In addition, as the dispersing medium of the slurry, water or the like may be used.

In this process, as a pre-process for applying the slurry, the following process is performed. That is, a process of adhering a small amount of fine particles, which are removable by combustion, to the surface of the partition wall of the honeycomb formed body (or the honeycomb dried body) is performed. After the process, when the slurry is applied, dried, and fired, the fine particles adhered to the surface of the partition wall are removed by the pre-process. As a result, the accumulation space can be formed between the surface trapping layer and the partition wall.

Examples of the fine particles include carbon particles, resin particles, and starch.

The particle diameter of the fine particles is preferably 5 µm to 30 µm. In addition, the amount of the adhered fine particles is preferably 0.05 g/L to 0.2 g/L for each filter volume.

The average pore diameter, porosity, and thickness of the surface trapping layer may be controlled depending on the particle diameter and the like of the fine raw material particles. For example, the average pore diameter and the like of the surface trapping layer may be controlled by controlling the concentration and the like of the slurry.

As a method of forming the surface trapping layer, in addition to the method of using the slurry, a method of using gas containing the fine raw material particles (gas flow method) may also be employed. Specifically, the fine raw material particles are transported by a gas flow of the gas (that is, the fine raw material particles are transported through the gas flow) such that a deposition layer of the fine raw material particles can be formed on the surface of the partition wall of the honeycomb fired body. By forming the surface trapping layer in this method, the surface trapping layer having a thin and uniform thickness can be formed.

In the gas flow method, before forming the deposition layer of the fine raw material particles on the surface of the partition wall, the following pre-process is performed. That is, a pre-proses of forming a deposition layer of the fine particles on the surface of the partition wall of the honeycomb fired body by transporting the fine particles through the gas flow of the gas is performed. By performing the pre-process, thereafter, drying and firing are performed, such that the porosity P1 of the central region can be allowed to be lower than the porosity P2 of the inlet region. That is, the exhaust gas purification filter in which voids are formed between the surface trapping layer and the partition wall can be obtained.

In addition, the coating membrane forming process may be performed after the firing process and the plugging process. That is, after obtaining the honeycomb formed body (or the honeycomb dried body obtained after drying that is performed as necessary) through the forming process, the plugging process and the firing process are performed, and thereafter the coating membrane forming process may be performed. As described above, in a case of performing the coating membrane forming process after performing the firing process, as a pre-process, the following process is performed. That is, before applying the slurry, a pre-process slurry containing the fine particles is allowed to pass through the honeycomb fired body such that a deposition layer of the fine particles is formed on the surface of the partition wall of the honeycomb fired body. Thereafter, the slurry containing the fine raw material particles is applied onto the deposition layer, thereby forming a coating layer. Thereafter, drying and firing are performed and thus the porosity P1 of the central region can be allowed to be lower than the porosity P2 of the inlet region. That is, the exhaust gas purification filter in which voids are formed between the surface trapping layer and the partition wall can be obtained.

(2-3) Firing Process

Before firing (main firing) the honeycomb formed body, the honeycomb formed body is preferably calcinated. Calcination is performed for degreasing and the method thereof is not particularly limited as long as organic matter (the organic binder, a dispersing agent, the pore former, and the like) in the honeycomb formed body can be removed. In general, the combustion temperature of the organic binder is about 100° C. to 300° C. and the combustion temperature of the pore former is about 200° C. to 800° C. Therefore, as for calcination conditions, heating at about 200° C. to 1000° C. for 3 hours to 100 hours in an oxidizing atmosphere is preferable.

Appropriate conditions may be selected for the firing (main firing) of the honeycomb formed body. For example, a firing temperature is preferably 1410° C. to 1440° C. In addition, a firing time is preferably 4 hours to 6 hours as a time for holding the maximum temperature.

(2-4) Plugging Process

As a method of forming the plugging portions, a method of disposing a mask on one open ends of the predetermined cells and filling the open ends of the residual cells with a plugging slurry may be employed. In addition, the method of forming the plugging portions may be performed; for example, according to a method of manufacturing a plugging portion in a known exhaust gas purification filter.

As the raw material of the plugging portion, the same raw material as that of the honeycomb structure body may be used. Accordingly, the expansion coefficients of the honeycomb formed body and the plugging portion can be allowed to be the same during firing. Therefore, the durability of the exhaust gas purification filter can be enhanced.

(3) Exhaust Gas Purifier

Figure 5:
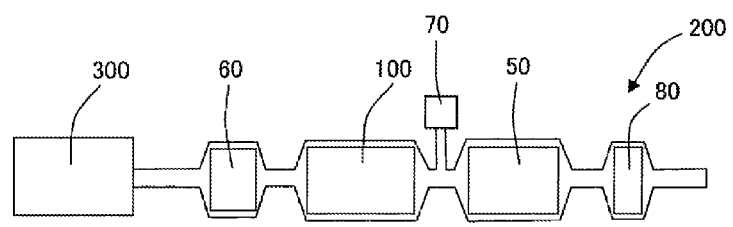
FIG. 5 is a plan view schematically showing a state in which an embodiment of an exhaust gas purifier of the invention is connected to an engine.

An embodiment of the exhaust gas purifier of the invention is an exhaust gas purifier 200 shown in FIG. 5. The exhaust gas purifier 200 includes the exhaust gas purification filter 100, an SCR catalyst converter 50, an upstream side oxidation catalyst 60, and a urea injector 70. The SCR catalyst converter 50 is a filter which is disposed on the downstream side of the exhaust gas purification filter 100 and includes an SCR catalyst loaded therein. The upstream side oxidation catalyst 60 is a filter which is disposed on the upstream side of the exhaust gas purification filter 100 and includes an oxidation catalyst loaded therein. The urea injector 70 is a device which can inject urea. The urea injector 70 is disposed between the upstream side oxidation catalyst 60 and the exhaust gas purification filter 100 or is disposed between the exhaust gas purification filter 100 and the SCR catalyst converter 50. In addition, the exhaust gas purifier 200 is for purifying the exhaust gas emitted from an engine 300. FIG. 5 is a plan view schematically showing a state in which the embodiment of the exhaust gas purifier of the invention is connected to the engine.

Since the exhaust gas purifier 200 includes the exhaust gas purification filter 100 (the exhaust gas purification filter of the invention), $NO_X$ in the exhaust gas can be properly purified even during the regeneration of the exhaust gas purification filter.

The exhaust gas purification filter 100 of the exhaust gas purifier 200 does not include a catalyst containing a precious metal loaded therein. Since the exhaust gas purification filter 100 is used, carbon monoxide and hydrocarbons generated in the exhaust gas purification filter 100 are not reduced by the catalyst. Therefore, the amount of carbon monoxide and hydrocarbons supplied to the SCR catalyst converter can be increased. As the exhaust gas purification filter 100, a filter which does not include a catalyst containing a precious metal loaded therein may be used.

The SCR catalyst converter 50 purifies $NO_X$ using ammonia generated by decomposition of urea injected from the urea injector 70. As the SCR catalyst converter, a known SCR catalyst converter may be appropriately employed. Specifically, the SCR catalyst converter includes a pillared honeycomb structure having partition walls for defining a plurality of cells, which are to become passage of a fluid, and an SCR catalyst loaded on the surfaces of the partition walls of the honeycomb structure.

The upstream side oxidation catalyst 60 purifies the carbon monoxide and hydrocarbons included in the exhaust gas. In addition, the upstream side oxidation catalyst 60 increases the temperature of the exhaust gas purification filter 100 during the regeneration of the exhaust gas purification filter 100. As an upstream side oxidation catalyst, a known oxidation catalyst may be appropriately employed. Specifically, the upstream side oxidation catalyst includes a pillared honeycomb structure having partition walls for defining a plurality of cells, which are to become passage of a fluid, and an oxidation catalyst loaded on the surfaces of the partition walls of the honeycomb structure.

The urea injector 70 is disposed between the upstream side oxidation catalyst 60 and the exhaust gas purification filter 100 or is disposed between the exhaust gas purification filter 100 and the SCR catalyst converter 50. That is, the urea injector 70 injects urea and supplies ammonia generated by decomposition of the urea to the exhaust gas purification filter 100 or the SCR catalyst converter 50 at upstream of the exhaust gas purification filter 100 or the SCR catalyst converter 50. As the urea injector 70, a known urea injector which can inject a predetermined amount of urea may be used.

The exhaust gas purifier 200 shown in FIG. 5 further includes a downstream side oxidation catalyst 80. The downstream side oxidation catalyst 80 is a honeycomb structure which is disposed on the downstream side of the SCR catalyst converter 50 and includes an oxidation catalyst loaded therein. Here, in the exhaust gas purifier of the invention, carbon monoxide and hydrocarbons are emitted from the exhaust gas purification filter and are supplied to the SCR catalyst converter during the regeneration of the exhaust gas purification filter. At this time, there may be cases where an excessive amount reductants ($NH_3$, CO, and HC), which is over the amount needed for the purification of $NO_X$ in the SCR catalyst converter is present in the SCR catalyst converter. In this case, there is a possibility that the reductants may be emitted to the air from the SCR catalyst converter. Here, by including the downstream side oxidation catalyst, the reductants emitted from the SCR catalyst converter are oxidized and removed, such that the emission of the reductants ($NH_3$, CO, and HC) to the outside of a vehicle can be prevented.

As the downstream side oxidation catalyst, the same oxidation catalyst as the upstream side oxidation catalyst may be used. Specifically, the downstream side oxidation catalyst includes a pillared honeycomb structure having partition walls for defining a plurality of cells, which are to become passage of a fluid, and an oxidation catalyst loaded on the surfaces of the partition walls of the honeycomb structure.

(4) Method of Using Exhaust Gas Purifier

An embodiment of a method of using the exhaust gas purifier of the invention includes: generating carbon monoxide and hydrocarbons by incompletely burning particulate matter in the exhaust gas purification filter 100 during an operation of burning off and removing the particulate matter accumulated in the exhaust gas purification filter 100; and purifying $NO_X$ in exhaust gas using the carbon monoxide and hydrocarbons in the SCR catalyst converter 50.

According to the method of using the exhaust gas purifier described above, $NO_X$ in the exhaust gas can be properly purified by using the exhaust gas purifier of the invention even during the regeneration of the exhaust gas purification filter. In addition, in the method of using the exhaust gas purifier of the invention, the urea may not be injected during the regeneration, and in this case, the amount of the urea that is injected from the urea injector and is thus consumed can be reduced. Here, in order to properly purify $NO_X$ in exhaust gas even during the regeneration of the exhaust gas purification filter, there is a need to supply a large amount of the urea. That is, during the regeneration, the SCR catalyst converter 50 is also exposed to a high temperature, and ammonia in the SCR catalyst converter 50 may be decomposed. Therefore, $NO_X$ in the SCR catalyst converter 50 cannot be sufficiently purified. In order to solve this problem, it is thought that a large amount of the urea is supplied in consideration of a decomposed amount. However, in this case, the amount of consumed urea is increased. According to the method of using the exhaust gas purifier of the invention, the amount of consumed urea can be reduced while properly purifying $NO_X$ in the exhaust gas during the regeneration of the exhaust gas purification filter.

In the method of using the exhaust gas purifier of the invention, since the exhaust gas purification filter of the invention described above is used, the particulate matter in the exhaust gas purification filter can be incompletely burned. That is, in the exhaust gas purification filter of the invention, the porosity P1 of the central region is lower than the porosity P2 of the inlet region, and specifically, voids are formed between the surface trapping layer and the partition wall. Therefore, particulate matter such as soot is accumulated in the voids. In addition, the particulate matter is exposed to a high temperature and enters a state of not being sufficiently supplied with oxygen during the operation of combustion removal (regeneration combustion process). The particulate matter is not sufficiently supplied with oxygen because it is present in the voids. This causes incomplete combustion of the particulate matter that is present in the voids and thus carbon monoxide and hydrocarbons are generated.

EXAMPLES

Hereinafter, the invention will be described in detail on the basis of Examples, and the invention is not limited to Examples.

Example 1

First, a plurality of honeycomb segments constituting a honeycomb structure body of an exhaust gas purification filter were manufactured. Specifically, a powder mixture was obtained by mixing 80 parts by mass of silicon carbide powder and 20 parts by mass of Si powder. A binder, a pore former, and water were added to the powder mixture. thereby preparing a kneaded material for formation.

Next, the prepared kneaded material for formation was extruded to a quadrangular prism shape, thereby obtaining a honeycomb formed body. The obtained honeycomb formed body was dried using a microwave dryer and was further completely dried using a hot air dryer. Thereafter, both end faces of the dried honeycomb formed body were cut, thereby obtaining a honeycomb segment having a predetermined length. Sixteen honeycomb segments were produced.

Next, a surface trapping layer was formed on an inflow surface which is a surface of the obtained honeycomb segment on an inflow cell side. As the raw material (fine raw material particles) of the surface trapping layer, a material having an average particle diameter of 20 μm was used. Fine particles including the fine raw material particles were applied onto the inflow surface of the honeycomb segment to form a coating membrane on the inflow surface of the honeycomb segment. Here, before forming a coating membrane, carbon particles having an average particle diameter of 15 μm were applied to the inflow surface of the honeycomb segment. Accordingly, the porosity P1 of a central region of a partition wall of the obtained honeycomb structure was allowed to be lower than the porosity P2 of an inlet region.

Next, the 16 honeycomb segments having the coating membranes formed thereon were fired at 1440° C. for 5 hours, thereby obtaining 16 honeycomb fired bodies.

Next, plugging portions (inflow side plugging portions and outflow side plugging portions) were formed on both end faces of cells of the honeycomb fired bodies so that the adjacent cells are alternately plugged. In this manner, plugged honeycomb segments were obtained. In addition, the plugged honeycomb segment does not include a catalyst containing a precious metal loaded therein.

The plugged honeycomb segment that was obtained had a quadrangular prism shape in which one side of the end face was 35 mm and the length in a cell extending direction was 152 mm. In addition, the thickness of the partition wall was 0.35 mm, the average pore diameter of the partition wall was 13 μm, and the cell density was 46.5 cells/cm². In addition, the standard deviation of the thickness of the partition wall was 15%.

In addition, the thickness of the surface trapping layer was 20 μm, the average pore diameter of the surface trapping layer was 1 μm, and the porosity of the surface trapping layer was 65%. In addition, the thicknesses, average pore diameters, and porosities of the surface trapping layer and the partition wall were obtained from a scanning electron microscope (SEM) image of the surface trapping layer and the partition wall.

In addition, in the plugged honeycomb segment that was obtained, the porosity P1 of the central region was 41%, and the porosity P2 of the inlet region was 60%. In addition, the value of the ratio of the porosity P2 of the inlet region to the porosity P1 of the central region was 1.46. The results are shown in Table 1.

A bonding material containing SiC particles, alumina fiber, and colloidal silica was applied to the side surface of the plugged honeycomb segment and was dried at 900° C. for 1 hour to be bonded thereto, thereby obtaining a honeycomb bonded body. Thereafter, the circumference of the obtained honeycomb bonded body was processed to have a diameter of 142 mm. The circumference thereof was applied with a circumferential coating having the same components as those of the bonding material and was dried at 600° C. for 1 hour, thereby obtaining an exhaust gas purification filter having a round pillar-shape with a diameter of 144 mm.

TABLE 1

| | Surface trapping layer | | | | | Average pore diameter of partition wall (μm) | Porosity | | | Main component of surface trapping layer | Main component of partition wall | Amount of loaded precious metal (g/L) | Ratio of precious metal (%) | Ratio of catalyst in outlet region (%) | Sum of HC and CO (ppm) |
|---|---|---|---|---|---|---|---|---|---|---|---|---|---|---|---|
| | Absence or presence | Thickness (μm) | Variations in thickness (%) | Average pore diameter (μm) | Fixing | | P1 (%) | P2 (%) | P2/P1 | | | | | | |
| Example 1 | Present | 30 | 10 | 2 | Integral firing | 15 | 42 | 44 | 1.05 | Oxide Bonded SiC | Oxide Bonded SiC | 0 | 0 | 93 | 500 |
| Example 2 | Present | 30 | 10 | 2 | Integral firing | 15 | 42 | 48 | 1.14 | Oxide Bonded SiC | Oxide Bonded SiC | 0 | 0 | 93 | 480 |
| Example 3 | Present | 30 | 10 | 2 | Integral firing | 15 | 42 | 62 | 1.48 | Oxide Bonded SiC | Oxide Bonded SiC | 0 | 0 | 95 | 520 |
| Example 4 | Present | 30 | 10 | 2 | Integral firing | 15 | 35 | 37 | 1.06 | Oxide Bonded SiC | Oxide Bonded SiC | 0 | 0 | 90 | 430 |
| Example 5 | Present | 30 | 10 | 2 | Integral firing | 15 | 35 | 39 | 1.11 | Oxide Bonded SiC | Oxide Bonded SiC | 0 | 0 | 91 | 480 |
| Example 6 | Present | 30 | 10 | 2 | Integral firing | 15 | 35 | 52 | 1.49 | Oxide Bonded SiC | Oxide Bonded SiC | 0 | 0 | 91 | 510 |
| Example 7 | Present | 10 | 10 | 2 | Integral firing | 15 | 42 | 55 | 1.31 | Oxide Bonded SiC | Oxide Bonded SiC | 0 | 0 | 95 | 550 |
| Example 8 | Present | 60 | 10 | 2 | Integral firing | 15 | 42 | 55 | 1.31 | Oxide Bonded SiC | Oxide Bonded SiC | 0 | 0 | 90 | 570 |
| Example 9 | Present | 60 | 10 | 0.3 | Integral firing | 15 | 42 | 55 | 1.31 | Oxide Bonded SiC | Oxide Bonded SiC | 0 | 0 | 82 | 400 |
| Example 10 | Present | 60 | 10 | 5 | Integral firing | 15 | 42 | 55 | 1.31 | Oxide Bonded SiC | Oxide Bonded SiC | 0 | 0 | 95 | 300 |
| Example 11 | Present | 30 | 10 | 2 | Integral firing | 10 | 42 | 55 | 1.31 | Oxide Bonded SiC | Oxide Bonded SiC | 0 | 0 | 95 | 500 |
| Example 12 | Present | 30 | 10 | 2 | Integral firing | 40 | 42 | 55 | 1.31 | Oxide Bonded SiC | Oxide Bonded SiC | 0 | 0 | 93 | 500 |
| Example 13 | Present | 30 | 5 | 2 | Integral firing | 15 | 42 | 55 | 1.31 | Oxide Bonded SiC | Oxide Bonded SiC | 0 | 0 | 95 | 550 |
| Example 14 | Present | 30 | 19 | 2 | Integral firing | 15 | 42 | 55 | 1.31 | Oxide Bonded SiC | Oxide Bonded SiC | 0 | 0 | 90 | 550 |
| Example 15 | Present | 30 | 10 | 2 | Integral firing | 15 | 42 | 55 | 1.31 | Oxide Bonded SiC | Oxide Bonded SiC | 0.5 | 0 | 82 | 250 |
| Example 16 | Present | 30 | 10 | 2 | Integral firing | 15 | 42 | 55 | 1.31 | Oxide Bonded SiC | Oxide Bonded SiC | 1 | 0 | 82 | 300 |

TABLE 1-continued

| | Surface trapping layer | | | | Average pore diameter of partition wall (μm) | Porosity | | | Main component of surface trapping layer | Main component of partition wall | Amount of loaded precious metal (g/L) | Ratio of precious metal (%) | Ratio of catalyst in outlet region (%) | Sum of HC and CO (ppm) |
|---|---|---|---|---|---|---|---|---|---|---|---|---|---|---|
| | Absence or presence | Thickness (μm) | Variations in thickness (%) | Average pore diameter (μm) | Fixing | | P1 (%) | P2 (%) | P2/P1 | | | | | |
| Example 17 | Present | 30 | 10 | 2 | Integral firing | 15 | 42 | 55 | 1.31 | Oxide Bonded SiC | Oxide Bonded SiC | 1 | 10 | 82 | 200 |
| Example 18 | Present | 30 | 10 | 2 | Integral firing | 15 | 42 | 55 | 1.31 | Oxide Bonded SiC | Oxide Bonded SiC | 1 | 20 | 82 | 150 |
| Example 19 | Present | 30 | 22 | 2 | Integral firing | 15 | 42 | 55 | 1.31 | Oxide Bonded SiC | Oxide Bonded SiC | 0 | 0 | 82 | 480 |
| Example 20 | Present | 30 | 10 | 2 | Drying | 15 | 42 | 55 | 1.31 | Oxide Bonded SiC | Oxide Bonded SiC | 0 | 0 | 83 | 530 |
| Example 21 | Present | 30 | 10 | 2 | Drying | 15 | 42 | 55 | 1.31 | Alumina | Oxide Bonded SiC | 0 | 0 | 82 | 510 |
| Example 22 | Present | 30 | 10 | 2 | Integral firing | 15 | 42 | 55 | 1.31 | Oxide Bonded SiC | Oxide Bonded SiC | 1 | 25 | 85 | 50 |

In Tables 1 and 2, the section "variations in thickness" represents the standard deviation of the thickness of the surface trapping layer when the arbitrary 10 points were selected and the thicknesses thereof were measured. Specifically, first, five arbitrary points which are at intermediate positions in the cell extending direction and are present in a section in a direction perpendicular to the cell extending direction are selected. Next, other than these points, five arbitrary points which are present in a section perpendicular to the cell extending direction are selected. The standard deviation σ of the thickness of the surface trapping layer at the ten points in total was calculated. Variations in the thickness of the surface trapping layer calculated as described above (the standard deviation of the thickness of the surface trapping layer) are shown. "Integral firing" in the section "fixing" means to form a coating membrane by applying the fine raw material particles to the surface of the partition wall of the honeycomb formed body (structure before firing) and thereafter to fire the resultant, thereby integrally firing the honeycomb formed body and the coating membrane formed of the fine raw material particles. In addition, "drying" means to form a coating membrane by applying the fine raw material particles to the surface of the partition wall of the honeycomb fired body obtained by firing the honeycomb formed body and thereafter to dry the coating membrane, thereby forming the surface trapping layer. The section "ratio of precious metal" represents the ratio of a contained precious metal calculated by cutting out a small piece from the partition wall, crushing the small piece, and performing wet quantitative analysis thereon. The section "sum of HC and CO" represents the ratio of the sum of hydrocarbons and carbon monoxide measured by analyzing tailpipe exhaust gas using an exhaust gas analyzer.

On the obtained exhaust gas purification filter, evaluations of "tailpipe $NO_X$ during regeneration", "pressure loss", "durability of surface trapping layer", and "comprehensive evaluation" were performed in the following method. The results are shown in Table 3.

(Tailpipe $NO_X$ During Regeneration)

Evaluation of tailpipe $NO_X$ during regeneration was performed as follows. Specifically, as shown in FIG. 5, in the order from the upstream side, the upstream side oxidation catalyst 60, the manufactured exhaust gas purification filter 100, the SCR catalyst converter 50, and the downstream side oxidation catalyst 80 were arranged. In addition, the urea injector 70 was disposed between the exhaust gas purification filter 100 and the SCR catalyst converter 50. In this manner, an exhaust gas purifier was produced. In addition, a supply port on the upstream side oxidation catalyst 60 side was connected to an exhaust port of the diesel engine 300. Thereafter, measurement was performed as follows. First, the diesel engine 300 was operated under conditions of revolutions of 2000 rpm and a load of 20%. Next, a post-injection amount of a fuel was increased, and the regeneration of soot in the exhaust gas purification filter was performed for 10 minutes under the condition in which the temperature of the exhaust gas reached 650° C. In the meanwhile, a cumulative $NO_X$ emission amount from the tailpipe was measured. Thereafter, evaluation was performed according to the following criteria. The results are shown in Table 3.

The case where the concentration of tailpipe $NO_X$ was lower than 350 ppm was evaluated as "OK", and the case where the concentration of tailpipe $NO_X$ was 350 ppm or higher was evaluated as "NG".

(Pressure Loss (kPa))

When pressure loss was measured, first, the manufactured exhaust gas purification filter was accommodated in a can body to obtain a test device. Next, to this test device, gas (air) that did not contain soot at 25° C. was supplied at a flow rate of 10 Nm³/min. The pressure loss in this case was measured.

The measured pressure loss was evaluated according to the following criteria. The case where the pressure loss was lower than 20 kPa was evaluated as "OK", and the case where the pressure loss was 20 kPa or higher was evaluated as "NG".

(Durability of Surface Trapping Layer)

Evaluation of the durability of the surface trapping layer was performed as follows. Specifically, first, the exhaust gas purification filter was connected to a gas burner. In addition, maintaining a state in which the temperature of exhaust gas that was allowed to flow through this filter was 800° C. for 10 minutes and thereafter maintaining a state in which the temperature of exhaust gas was 200° C. for 10 minutes were referred to as one cycle. In addition, a test for performing 200 cycles while applying an exciting force of 30 G at 100 Hz to the exhaust gas purification filter (durability test) was conducted. Next, a dry weight after the test was measured. Thereafter, evaluation was performed according to the following criteria. The results are shown in Table 3.

The case where a change in the dry weight before and after the test was smaller than 2 g was evaluated as "OK", and the case where a change in the dry weight was 2 g or greater was evaluated as "NG".

(Comprehensive Evaluation)

The case where all evaluation items were evaluated as OK was evaluated as "OK", and the case where any one of the evaluation items was evaluated as NG was evaluated as "NG".

Examples 2 to 22, Comparative Examples 1 to 9

An exhaust gas purification filter was manufactured in the same manner as in Example 1 except that changes shown in Tables 1 and 2 were applied. In addition, in the manufactured exhaust gas purification filter, as in Example 1, evaluations of "tailpipe $NO_X$ during regeneration", "pressure loss", "durability of surface trapping layer", and "comprehensive evaluation" were performed. The results are shown in Table 3.

TABLE 2

| | Surface trapping layer | | | | | Average pore diameter of partition wall (μm) | Porosity | | | Main component of surface trapping layer | Main component of partition wall | Amount of loaded precious metal (g/L) | Ratio of precious metal (%) | Sum of HC and CO (ppm) |
|---|---|---|---|---|---|---|---|---|---|---|---|---|---|---|
| | Absence or presence | Thickness (μm) | Variations in thickness (%) | Average pore diameter (μm) | Fixing | | P1 (%) | P2 (%) | P2/P1 | | | | | |
| Comparative Example 1 | Absent | 30 | 10 | 2 | Integral firing | 15 | 42 | 55 | 1.31 | Oxide Bonded SiC | Oxide Bonded SiC | 0 | 0 | 50 |
| Comparative Example 2 | Present | 7 | 10 | 2 | Integral firing | 15 | 42 | 55 | 1.31 | Oxide Bonded SiC | Oxide Bonded SiC | 0 | 0 | 50 |
| Comparative Example 3 | Present | 70 | 10 | 2 | Integral firing | 15 | 42 | 55 | 1.31 | Oxide Bonded SiC | Oxide Bonded SiC | 0 | 0 | 250 |
| Comparative Example 4 | Present | 30 | 10 | 0.1 | Integral firing | 15 | 42 | 55 | 1.31 | Oxide Bonded SiC | Oxide Bonded SiC | 0 | 0 | 500 |
| Comparative Example 5 | Present | 30 | 10 | 6 | Integral firing | 15 | 42 | 55 | 1.31 | Oxide Bonded SiC | Oxide Bonded SiC | 0 | 0 | 60 |
| Comparative Example 6 | Present | 30 | 10 | 2 | Integral firing | 15 | 42 | 43 | 1.02 | Oxide Bonded SiC | Oxide Bonded SiC | 0 | 0 | 50 |
| Comparative Example 7 | Present | 30 | 10 | 2 | Integral firing | 15 | 42 | 65 | 1.55 | Oxide Bonded SiC | Oxide Bonded SiC | 0 | 0 | 480 |
| Comparative Example 8 | Present | 30 | 10 | 2 | Integral firing | 15 | 35 | 36 | 1.03 | Oxide Bonded SiC | Oxide Bonded SiC | 0 | 0 | 55 |
| Comparative Example 9 | Present | 30 | 10 | 2 | Integral firing | 15 | 35 | 55 | 1.57 | Oxide Bonded SiC | Oxide Bonded SiC | 0 | 0 | 480 |

TABLE 3

| | Evaluation results | | | | | |
|---|---|---|---|---|---|---|
| | Tailpipe $NO_x$ during regeneration | | Pressure loss | | Durability of surface trapping layer | Comprehensive evaluation |
| | (ppm) | Evaluation | (kPa) | Evaluation | | |
| Example 1 | 80 | OK | 15 | OK | OK | OK |
| Example 2 | 90 | OK | 14 | OK | OK | OK |
| Example 3 | 75 | OK | 13 | OK | OK | OK |
| Example 4 | 100 | OK | 17 | OK | OK | OK |
| Example 5 | 95 | OK | 16 | OK | OK | OK |
| Example 6 | 80 | OK | 16 | OK | OK | OK |
| Example 7 | 75 | OK | 13 | OK | OK | OK |
| Example 8 | 70 | OK | 17 | OK | OK | OK |
| Example 9 | 95 | OK | 18 | OK | OK | OK |
| Example 10 | 120 | OK | 13 | OK | OK | OK |
| Example 11 | 82 | OK | 13 | OK | OK | OK |
| Example 12 | 85 | OK | 15 | OK | OK | OK |
| Example 13 | 76 | OK | 12 | OK | OK | OK |
| Example 14 | 78 | OK | 17 | OK | OK | OK |
| Example 15 | 120 | OK | 18 | OK | OK | OK |
| Example 16 | 140 | OK | 19 | OK | OK | OK |
| Example 17 | 145 | OK | 19 | OK | OK | OK |
| Example 18 | 150 | OK | 19 | OK | OK | OK |
| Example 19 | 85 | OK | 20 | OK | OK | OK |
| Example 20 | 85 | OK | 19 | OK | OK | OK |
| Example 21 | 83 | OK | 18 | OK | OK | OK |
| Example 22 | 340 | OK | 17 | OK | OK | OK |

TABLE 3-continued

| | Evaluation results | | | | | |
|---|---|---|---|---|---|---|
| | Tailpipe $NO_x$ during regeneration | | Pressure loss | | Durability of surface trapping layer | Comprehensive evaluation |
| | (ppm) | Evaluation | (kPa) | Evaluation | | |
| Comparative Example 1 | 620 | NG | 15 | OK | OK | NG |
| Comparative Example 2 | 420 | NG | 16 | OK | OK | NG |
| Comparative Example 3 | 150 | OK | 25 | NG | OK | NG |
| Comparative Example 4 | 79 | OK | 30 | NG | OK | NG |
| Comparative Example 5 | 440 | NG | 15 | OK | OK | NG |
| Comparative Example 6 | 633 | NG | 15 | OK | OK | NC |
| Comparative Example 7 | 85 | OK | 14 | OK | NG | NG |
| Comparative Example 8 | 633 | NG | 14 | OK | OK | NG |
| Comparative Example 9 | 85 | OK | 16 | OK | NG | NG |

The exhaust gas purification filters in Examples 1 to 22 were evaluated as "OK" in the comprehensive evaluation. In addition, it was seen from Table 3 that the exhaust gas purification filters in Examples 1 to 22 can properly purify $NO_X$ in exhaust gas even during the regeneration of the filter, suppress an increase in pressure loss, and have good durability in the surface trapping layer, compared to the exhaust gas purification filters in Comparative Examples 1 to 9.

INDUSTRIAL APPLICABILITY

The exhaust gas purification filter of the invention can be employed as a filter for purifying exhaust gas emitted from a vehicle or the like.

DESCRIPTION OF REFERENCE NUMERALS

1: Partition wall, 2: Cell, 2a: Inflow cell, 3: Inflow surface, 5: Central region, 6: Inlet region, 7: Outlet region, 8a: Inflow side plugging portion, 8b: Outflow side plugging portion, 10: Honeycomb structure body, 11: Inflow end face, 12: Outflow end face, 15a: Inner surface, 20: Circumferential wall, 30: Void, 50: SCR catalyst converter, 60: Upstream side oxidation catalyst, 70: Urea injector, 80: Downstream side oxidation catalyst, 100: Exhaust gas purification filter, 200: Exhaust gas purifier, 300: Engine

What is claimed is:

1. An exhaust gas purification filter, comprising:
a pillared honeycomb structure body having porous partition walls for defining a plurality of cells that extend from an inflow end face as one end face to an outflow end face as the other end face;
inflow side plugging portions disposed on the inflow end face of predetermined cells of the plurality of cells;
outflow side plugging portions disposed on the outflow end face of residual cells of the plurality of cells; and
a porous surface trapping layer disposed on an inflow surface which is a surface on an inflow cell side which is the cell in which the outflow side plugging portion is disposed, among surfaces of the partition walls,
wherein the surface trapping layer has a thickness of 10 μm to 60 μm,
the surface trapping layer has an average pore diameter of 0.3 μm to 5 μm, and
in a section of the partition wall which is parallel to a cell extending direction, a region between a position at 10% of a length of the partition wall in a thickness direction thereof and a position at 90% of the length of the partition wall in the thickness direction thereof is referred to as a central region and a region between the central region and the surface trapping layer is referred to as an inlet region, a porosity P1 of the central region is lower than a porosity P2 of the inlet region.

2. The exhaust gas purification filter according to claim 1, wherein a value of a ratio of the porosity P2 of the inlet region to the porosity P1 of the central region is 1.05 to 1.8.

3. The exhaust gas purification filter according to claim 1, wherein a standard deviation of the thickness of the partition wall is 20% or lower.

4. The exhaust gas purification filter according to claim 2, wherein a standard deviation of the thickness of the partition wall is 20% or lower.

5. The exhaust gas purification filter according to claim 1, wherein both of the partition wall and the surface trapping layer is made of a material that contains silicon carbide particles as aggregates and a binding material that binds the aggregates as main components, and
the binding material is made of cordierite, mullite, alumina, or an oxide of a mixture thereof.

6. The exhaust gas purification filter according to claim 2, wherein both of the partition wall and the surface trapping layer is made of a material that contains silicon carbide particles as aggregates and a binding material that binds the aggregates as main components, and
the binding material is made of cordierite, mullite, alumina, or an oxide of a mixture thereof.

7. The exhaust gas purification filter according to claim 3, wherein both of the partition wall and the surface trapping layer is made of a material that contains silicon carbide particles as aggregates and a binding material that binds the aggregates as main components, and
the binding material is made of cordierite, mullite, alumina, or an oxide of a mixture thereof.

8. The exhaust gas purification filter according to claim 4, wherein both of the partition wall and the surface trapping layer is made of a material that contains silicon carbide particles as aggregates and a binding material that binds the aggregates as main components, and
the binding material is made of cordierite, mullite, alumina, or an oxide of a mixture thereof.

9. The exhaust gas purification filter according to claim 1, wherein the partition wall and the surface trapping layer are monolithically formed with each other by firing.

10. The exhaust gas purification filter according to claim 1, wherein a catalyst containing a precious metal is not loaded, or the catalyst containing the precious metal is loaded in a proportion of 1 g/L or less.

11. The exhaust gas purification filter according to claim 1, wherein 80 mass % or more of the catalyst containing the precious metal is loaded in an outlet region which is a region excluding the central region and the inlet region of the partition wall.

12. An exhaust gas purifier for purifying exhaust gas emitted from an engine, comprising:

the exhaust gas purification filter according to claim 1;

an SCR catalyst converter which is disposed on a downstream side of the exhaust gas purification filter and includes an SCR catalyst loaded therein;

an upstream side oxidation catalyst which is disposed on an upstream side of the exhaust gas purification filter and includes an oxidation catalyst loaded therein; and a urea injector which is disposed between the upstream side oxidation catalyst and the exhaust gas purification filter or is disposed between the exhaust gas purification filter and the SCR catalyst converter to inject urea.

13. The exhaust gas purifier according to claim 12, wherein the exhaust gas purification filter does not include a catalyst containing a precious metal loaded therein.

14. The exhaust gas purifier according to claim 12, further comprising:

a downstream side oxidation catalyst which is disposed on a downstream side of the SCR catalyst converter and includes an oxidation catalyst loaded therein.

15. A method of using the exhaust gas purifier comprising:

generating carbon monoxide and hydrocarbons by incompletely burning particulate matter in the exhaust gas purification filter during an operation of burning off and removing the particulate matter accumulated in the exhaust gas purification filter of the exhaust gas purifier according to claim 12;

supplying the generated carbon monoxide and hydrocarbons to the SCR catalyst converter; and purifying $NO_X$ in exhaust gas using the carbon monoxide and hydrocarbons in the SCR catalyst converter.

* * * * *